(12) United States Patent
Stewart

(10) Patent No.: US 7,174,785 B2
(45) Date of Patent: Feb. 13, 2007

(54) OSCILLATION OF VIBRATING BEAM IN A FIRST DIRECTION FOR A FIRST TIME PERIOD AND A SECOND DIRECTION FOR A SECOND TIME PERIOD TO SENSE ANGULAR RATE OF THE VIBRATING BEAM

(75) Inventor: Robert E. Stewart, Woodland Hills, CA (US)

(73) Assignee: Northrop Grumman Corporation, Los Angeles, CA (US)

( * ) Notice: Subject to any disclaimer, the term of this patent is extended or adjusted under 35 U.S.C. 154(b) by 176 days.

(21) Appl. No.: 11/057,324

(22) Filed: Feb. 11, 2005

(65) Prior Publication Data

US 2005/0193816 A1    Sep. 8, 2005

Related U.S. Application Data

(60) Provisional application No. 60/459,709, filed on Mar. 3, 2004, provisional application No. 60/549,710, filed on Mar. 3, 2004.

(51) Int. Cl.
*G01P 9/04* (2006.01)
(52) U.S. Cl. ............................ 73/504.12; 73/504.14
(58) Field of Classification Search ............ 73/504.12, 73/504.14, 504.15
See application file for complete search history.

(56) References Cited

U.S. PATENT DOCUMENTS 5,918,280 A * 6/1999 Gang et al. ............... 73/504.12

* cited by examiner

*Primary Examiner*—John E. Chapman
(74) *Attorney, Agent, or Firm*—Carmen B. Patti & Assoc., LLC

(57) ABSTRACT

An apparatus in one example comprises a vibrating beam, a first drive component, and a second drive component. The first drive component for a first time period oscillates the vibrating beam in a first direction to sense angular rate of the vibrating beam. The second drive component for a second time period oscillates the vibrating beam in a second direction to sense angular rate of the vibrating beam.

21 Claims, 2 Drawing Sheets

OSCILLATION OF VIBRATING BEAM IN A FIRST DIRECTION FOR A FIRST TIME PERIOD AND A SECOND DIRECTION FOR A SECOND TIME PERIOD TO SENSE ANGULAR RATE OF THE VIBRATING BEAM

CROSS-REFERENCE TO RELATED APPLICATIONS

This application claims the priority of U.S. provisional Patent Application Ser. No. 60/549,709 (by Robert E. Stewart, filed Mar. 3, 2004, and entitled "OSCILLATION OF VIBRATING BEAM IN A FIRST DIRECTION FOR A FIRST TIME PERIOD AND A SECOND DIRECTION FOR A SECOND TIME PERIOD TO SENSE ANGULAR RATE OF THE VIBRATING BEAM").

This application contains subject matter that is related to the subject matter of the following applications, which are assigned to the same assignee as this application. The below-listed applications are hereby incorporated herein by reference in their entireties.

U.S. provisional Patent Application Ser. No. 60/549,710 (by Robert E. Stewart, filed Mar. 3, 2004, and entitled "SUPPORT OF VIBRATING BEAM NEAR NODAL POINT").

"SUPPORT OF VIBRATING BEAM NEAR NODAL POINT," by Robert E. Stewart, co-filed herewith.

TECHNICAL FIELD

The invention relates generally to electromechanical systems and more particularly to drive and sense modes of vibrating beams.

BACKGROUND

An electromechanical system in one example measures a parameter. The electromechanical system may comprise a micro-electromechanical system ("MEMS") accelerometer or gyroscope that measures the parameter. For example, the accelerometer measures an acceleration and the gyroscope measures an angular rate (e.g., rotation). The gyroscope in one example comprises a vibrating beam with high Q degenerate fundamental modes of vibration. For example, high Q vibrating beams require little energy to sustain vibration. The vibrating beam in one example is employable for high performance closed loop angular rate sensing. The vibrating beam in another example is employable for lower performance open loop angular rate sensing. The mathematical model of the symmetrical vibrating beam is in many aspects similar to a vibrating ring or hemispherical resonator gyroscope ("HRG"). The analytical similarity to the hemispherical resonator gyroscope indicates that the vibrating beam gyroscope has the potential of achieving similar performance.

Drive components coupled with the vibrating beam cause a first oscillation of the vibrating beam. An angular rate of the vibrating beam and the first oscillation induce a Coriolis force on the vibrating beam. For example, the angular rate is about the longitudinal axis of the vibrating beam. The Coriolis force causes a second oscillation of the vibrating beam 102. The second oscillation is substantially perpendicular to the first oscillation. Feedback components in one example provide feedback on a magnitude of the first oscillation to the drive components for regulation of the first oscillation. Pickoff sensor components sense the second oscillations and apply control signals to null the pickoff signal. The control signals are a measure of the magnitude and polarity of the angular rate of the vibrating beam.

The drive/pickoff components oscillate the vibrating beam and control the amplitude of vibration in a first direction and the pickoff/drive components sense and control the second oscillation from a second direction. As the vibrating beam is driven in one direction, misalignments associated with manufacturing tolerances and electronic phase errors in the servo electronics may cause vibration in the sense direction which is interpreted as angular rate. Variations in the magnitude of the misalignment or the phase of the servo electronics over time and temperature introduce gyroscope bias drift error. As one shortcoming, since the drive oscillation of the vibrating beam remains in the first direction during operation, bias errors are introduced over time and varying temperature. Differences in the damping time constants between the drive and sense directions of the vibrating beam due to gas squeeze film, thermal elastic, and mounting damping effects can be interpreted as angular rate. Variation in these differential time constants introduces gyroscope bias drift.

Thus, a need exists for an angular rate sensing gyroscope that promotes a reduction in bias drift error.

SUMMARY

The invention in one embodiment encompasses an apparatus. The apparatus comprises a vibrating beam, a first drive component, and a second drive component. The first drive component for a first time period oscillates the vibrating beam in a first direction to sense angular rate of the vibrating beam. The second drive component for a second time period oscillates the vibrating beam in a second direction to sense angular rate of the vibrating beam.

The invention in another embodiment encompasses an apparatus. The apparatus comprises a plurality of coplanar vibrating beams, a first set of drive/sensor components, and a second set of drive/sensor components. The plurality of coplanar vibrating beams comprises a first vibrating beam and a second vibrating beam. The first set of drive/sensor components is associated with the first vibrating beam. The second set of drive/sensor components is associated with the second vibrating beam. During a first time period the first set of drive/sensor components oscillates the first vibrating beam in an in-plane direction to sense angular rate of the first vibrating beam. During the first time period the second set of drive/sensor components changes the second vibrating beam from oscillation in the in-plane direction to oscillation in an out-of-plane direction. During a second time period the second set of drive/sensor components oscillates the second vibrating beam in the out-of-plane direction to sense angular rate of the second vibrating beam. During the second time period the first set of drive/sensor components changes the first vibrating beam from oscillation in the in-plane direction to oscillation in the out-of-plane direction.

The invention in yet another embodiment encompasses a method. During a first time period a first vibrating beam of a gyroscope is oscillated in a first direction to sense angular rate of the gyroscope. During a second time period oscillation of the first vibrating beam is changed from the first direction to a second direction contemporaneously with oscillation of a second vibrating beam of the gyroscope to sense angular rate of the gyroscope. During a third time period the first vibrating beam is oscillated in the second direction to sense angular rate of the gyroscope.

DESCRIPTION OF THE DRAWINGS

Features of exemplary implementations of the invention will become apparent from the description, the claims, and the accompanying drawings in which:

DETAILED DESCRIPTION

Figure 1:
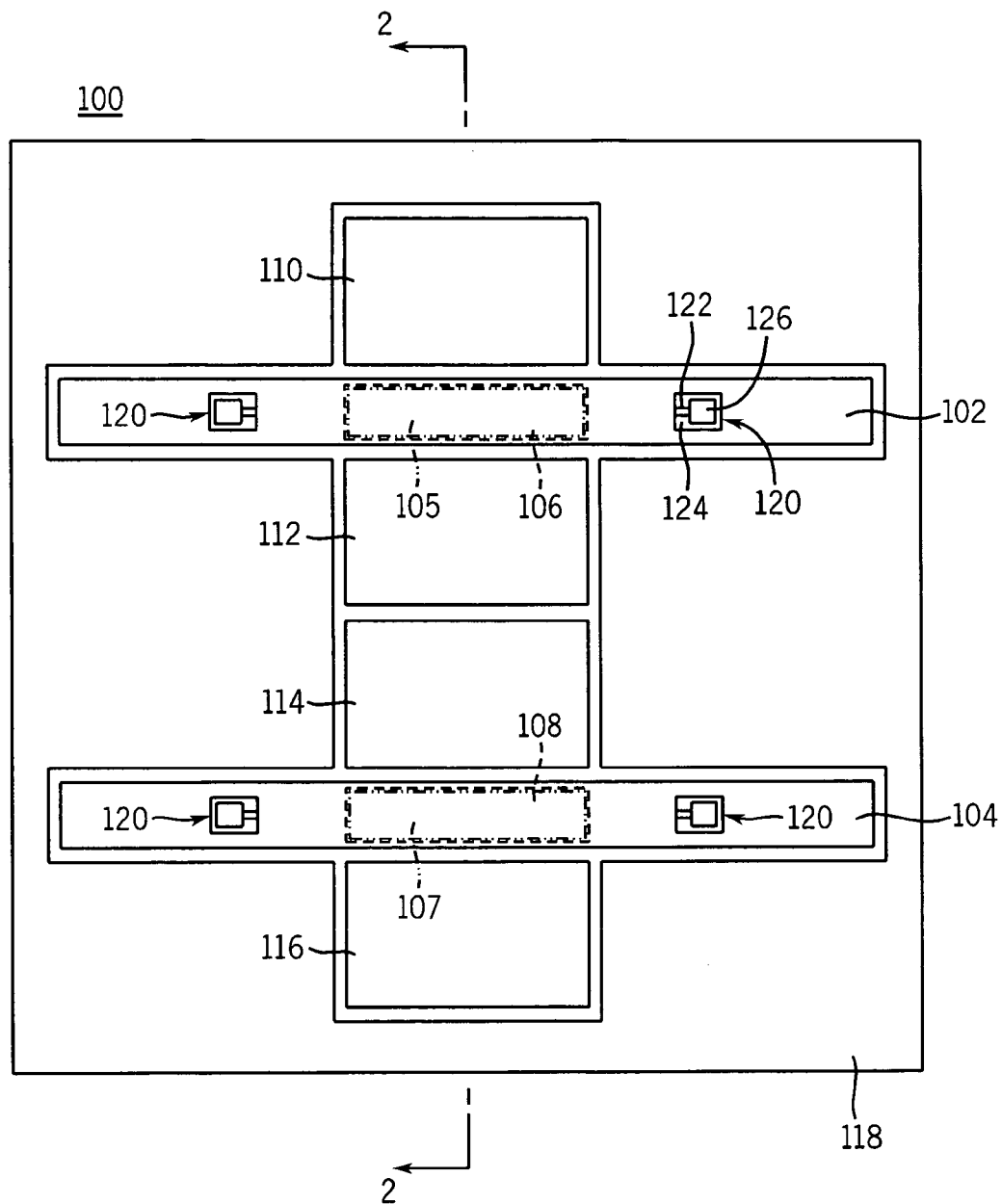
FIG. 1 is a representation of an exemplary implementation of an apparatus that comprises a plurality of vibrating beams and a plurality of drive/sense components. The top cover is removed for clarity.

Turning to FIG. 1, an apparatus 100 in one example comprises a micro-electromechanical system ("MEMS") gyroscope. The gyroscope is employable for high accuracy navigation angular rate sensing. The apparatus 100 in one example comprises a plurality of vibrating beams 102 and 104 and a plurality of drive/sensor components 105, 106, 107, 108, 110, 112, 114, and 116. Depending on an oscillation mode of the vibrating beams 102 and 104, a first subgroup of the drive/sensor components 105, 106, 107, 108, 110, 112, 114, and 116 drive a first oscillation of the vibrating beams 102 and 104 and a second subgroup of the drive/sensor components 105, 106, 107, 108, 110, 112, 114, and 116 sense a second Coriolis induced oscillation of the vibrating beams 102 and 104.

In one example, the drive oscillation of the vibrating beam 102 is along a first direction (e.g., out-of-plane). So, the drive/sensor components 105 and 106 serve as drive components for the vibrating beam 102 and the drive/sensor components 110 and 112 serve as pickoff sensors for the vibrating beam 102. In another example, the drive oscillation of the vibrating beam 102 is along a second direction (e.g., in-plane). So, the drive/sensor components 110 and 112 serve as drive components for the vibrating beam 102 and the drive/sensor components 105 and 106 serve as pickoff sensors for the vibrating beam 102.

Figure 2:
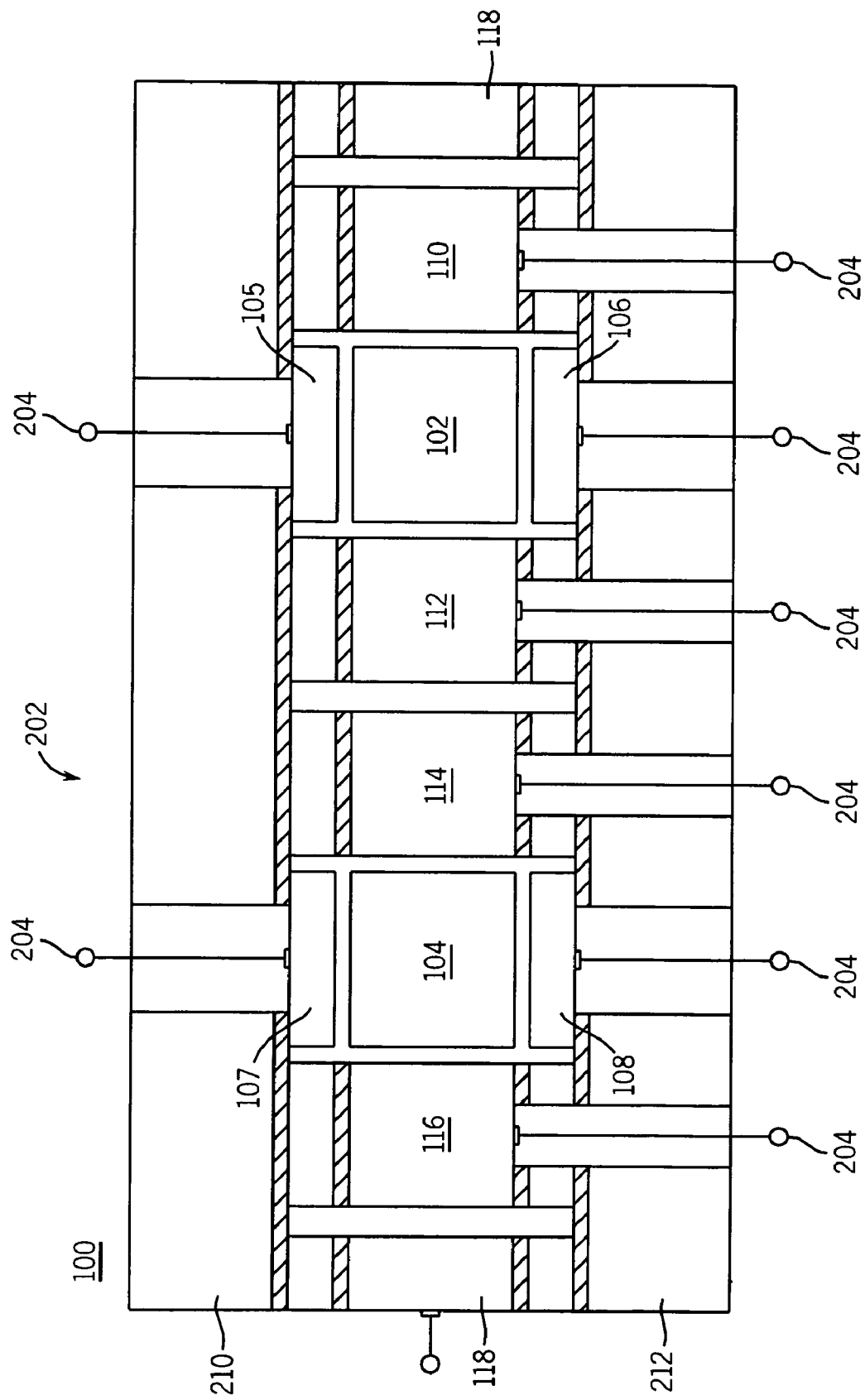
FIG. 2 is a sectional representation of the apparatus, including the top cover, directed along line 2—2 of FIG. 1.

The plurality of vibrating beams 102 and 104 in one example comprise two or more vibrating beams for each measurement axis. For example, the vibrating beams 102 and 104 both contribute to sensing angular rate for one measurement axis. The vibrating beams 102 and 104 in one example each comprise a rectangular, triangular, or circular prism. For example, the rectangular prism comprises a length dimension that is greater than a width dimension and a height dimension. In another example, the vibrating beam 102 comprises a cross-section that is a hexagon or an octagon. The vibrating beams 102 and 104 in one example are constructed from a material with low internal loss to achieve high Q. For example, high Q vibrating beams require little energy to sustain oscillation. The drive and sense methods of the vibrating beams 102 and 104 are chosen to excite and read out the motion of the vibrating beams 102 and 104 while retaining the high Q. In one example, the vibrating beam 102 comprises an integral silicon beam. In another example, the vibrating beam 102 comprises a plurality of silicon layers, such as three silicon layers bonded together. For example, the three silicon layers comprise a center layer, a top cover 210 (FIG. 2), and a bottom cover 212 (FIG. 2). The top and bottom covers 210 and 212 serve to hermetically seal the center layer. The center layer comprises the vibrating beams 102 and 104 and the drive/sensor components 110, 112, 114, and 116. The top cover 210 comprises the drive/sensor components 105, 106, 107, 108. In yet another example, the vibrating beam 102 comprises an integral crystalline quartz beam employing piezoelectric drive and sensing. In still yet another example, the vibrating beam 102 comprises a permeable material employing magnetic drive and sensing.

The vibrating beam 102 comprises one or more nodal axes for vertical oscillation (e.g., vertical vibration). For example, vertical oscillation of the vibrating beam 102 may occur about the nodal axes. The vibrating beam 102 also comprises one or more nodal axes for horizontal oscillation (e.g., horizontal vibration). For example, horizontal oscillation of the vibrating beam 102 may occur about the nodal axes. The nodal axis for vertical oscillation and the nodal axis for horizontal oscillation in one example intersect at a nodal point. The nodal point remains substantially still for oscillation in any one or more of a plurality of substantially perpendicular directions. For example, the nodal point remains substantially still during both vertical oscillation and horizontal oscillation. The vibrating beam 102 comprises one or more connection components 120 that serve to connect a frame 118 with the vibrating beam 102 at the nodal point of the vibrating beam 102.

The vibrating beam 102 in one example is supported by a flexure component 122 connected to the frame 118 through the top and bottom covers 210 and 212 (FIG. 2). The flexure component 122 allows movement of the vibrating beam 102 about the nodal point upon occurrence of an angular rate. For example, the angular rate is about the longitudinal axis of the vibrating beam. Pickoff sensors and processing components measure and translate the movement of the vibrating beam 102 into a signal representing the direction and magnitude of the angular rate.

The flexure component 122 allows horizontal and vertical oscillation of the vibrating beam 102 about the nodal point. The flexure component 122 comprises a reduced section of the vibrating beam 102 that lies along a center line of a longitudinal axis of the vibrating beam 102. The nodal point in one example is internal to the vibrating beam 102. For example, the vibrating beam 102 comprises one or more apertures 124 that expose an area around the nodal point. The aperture 124 in one example passes through the vibrating beam 102. The aperture 124 surrounds the nodal point and the flexure component 122 to provide space for movement of the vibrating beam 102. The aperture 124 is near the nodal point. The aperture 124 allows the frame 118 to support the vibrating beam substantially near the nodal point. The aperture 124 comprises an open space etched from a surface of the vibrating beam 102 to expose the nodal point and form the flexure component 122.

The flexure component 122 couples the vibrating beam 102 with a mounting component 126. The mounting component 126 couples the vibrating beam 102 with the frame 118 through the top and bottom covers 210 and 212 (FIG. 2). By coupling the vibrating beam 102 with the frame 118 near the nodal point, minimal translational oscillation energy of the vibrating beam 102 is transferred to support components, such as the mounting component 126 and the frame 118. Since the nodal point remains substantially still, connecting the vibrating beam 102 with the mounting component 126 at the nodal point internal to the vibrating beam 102 promotes a reduction in an amount of the oscillation energy of the vibrating beam 102 that is transferred to the support components. For example, connecting the vibrating beam 102 with the frame 118 at a location on the vibrating beam 102 that is in motion during oscillation would transfer oscillation energy from the vibrating beam 102 to the frame 118 resulting in mounting sensitivity. Less energy is required to sustain oscillation in the vibrating beam 102 and higher Q is achieved if the vibrating beam 102 is connected with the frame 118 at the nodal point than if the vibrating beam 102 is connected at the location on the vibrating beam 102 that is in motion during oscillation.

The nodal point comprises a first nodal point of the vibrating beam 102. The vibrating beam 102 also comprises a second nodal point. The second nodal point is connected to a second flexure component (e.g., analogous to the flexure component 122) and a second mounting component (e.g., analogous to the mounting component 126). The flexure components in one example comprise vibration isolators. The flexure component 122 applies a first moment to the mounting component 126. The second flexure component applies a second moment to the second mounting component. The second moment has an opposite polarity to the first moment. So, the second moment cancels the first moment in the frame 118.

In one example, the aperture 124 passes through the vibrating beam 102 in a vertical direction. In another example, the aperture 124 passes through the vibrating beam 102 symmetrically in both vertical and horizontal directions. For example, the aperture 124 passes through the vibrating beam 102 from a top surface of the vibrating beam 102 as well as a side surface of the vibrating beam 102. Therefore, the elastic characteristics are substantially similar in both vertical and horizontal oscillation directions for the vibrating beam 102. Since the aperture 124 passes through the top surface and the side surface of the vibrating beam 102, the stiffness of the vibrating beam 102 is similar in both vertical and horizontal oscillation directions. The vibrating beam 102 in one example also has the same resonant frequency in both oscillation directions.

The vibrating beams 102 and 104 in one example lay substantially in a plane, such as the plane of the frame 118 that supports the vibrating beams 102 and 104. The vibrating beams 102 and 104 in one example are symmetric for oscillation in two perpendicular directions. For example, the vibrating beams 102 and 104 are symmetric for oscillation both in an in-plane direction and an out-of-plane direction. In one example, the vibrating beam 102 oscillates in-plane contemporaneously with the vibrating beam 104 oscillating out-of-plane. In another example, the vibrating beam 102 oscillates out-of-plane contemporaneously with the vibrating beam 104 oscillating in-plane.

One or more of the drive/sensor components 105, 106, 107, 108, 110, 112, 114, and 116 may serve as drive and pickoff components at a given time and set the vibrating beams 102 and 104 into oscillation with a controlled amplitude (e.g., vibration). One or more of the drive/sensor components 105, 106, 107, 108, 110, 112, 114, and 116 may serve as sensor and forcer components at a give time and pickoff the second oscillations and force rebalance the second oscillation to null to measure a magnitude of the angular rate of the vibrating beams 102 and 104 about their longitudinal axes. Each of the drive/sensor components 105, 106, 107, 108, 110, 112, 114, and 116 in one example may serve as either a drive component or a sensor component at a given time.

To initialize an angular rate sensing gyroscope, the drive components of the drive/sensor components 105, 106, 107, 108, 110, 112, 114, and 116 cause a first oscillation of the vibrating beams 102 and 104. An angular rate of the vibrating beams 102 and 104 about their longitudinal axes and the first oscillation induce a Coriolis force on the vibrating beams 102 and 104. The Coriolis force causes a second oscillation of the vibrating beams 102 and 104. The second oscillation is substantially perpendicular to the first oscillation. Feedback components in one example provide feedback on a magnitude of the first oscillation to the drive components 106 and 108 for regulation of the first oscillation. The sensor components of the drive/sensor components 105, 106, 107, 108, 110, 112, 114, and 116 pickoff the second oscillations and apply control signals to null the pickoff signal. The control signals are a measure of the magnitude and polarity of the angular rate of the vibrating beams 102 and 104.

The drive components of the drive/sensor components 105, 106, 107, 108, 110, 112, 114, and 116 in one example may comprise electrostatic drive components, magnetic drive and/or piezoelectric drive components. The sensor components of the drive/sensor components 105, 106, 107, 108, 110, 112, 114, and 116 in one example may comprise capacitive pickoff sensors, magnetic pickoff sensors, and/or piezoelectric pickoff sensors.

Referring to FIGS. 1-2, a sectional representation 202 of the angular rate sensing gyroscope directed along line 2—2 of FIG. 1 illustrates a plurality of connection components 204 coupled with the drive/sensor components 105, 106, 107, 108, 110, 112, 114, and 116. The connection components 204 in one example comprise electrical paths to the drive/sensor components 105, 106, 107, 108, 110, 112, 114, and 116. In one example, electrical signals travel through the connection components 204 to control the drive/sensor components 105, 106, 107, 108, 110, 112, 114, and 116. In another example, the connection components 204 comprise electrical paths to sense in-plane motion and apply control signals to servo the in-plane motion to zero. For example, electrical signals travel through the connection components 204 to relay information from the drive/sensor components 105, 106, 107, 108, 110, 112, 114, and 116 to processing components that employ the electrical signals to determine the angular rate of the gyroscope.

An illustrative description of one exemplary operation of the apparatus 100 is now presented, for explanatory purposes. The angular rate sensing gyroscope in one example employs both of the vibrating beams 102 and 104 during angular rate sensing. The vibrating beams 102 and 104 may be in one of a plurality of states. For example, during a time period either of the vibrating beams 102 and 104 may be in an active state of oscillation and employed for angular rate sensing. Alternatively, either the vibrating beams 102 and 104 may be in an transition state from oscillation in a first direction to oscillation in a second direction. While one of the vibrating beams 102 and 104 is in the transition state, the gyroscope in one example does not employ angular rate data obtained from the transitioning one of the vibrating beams 102 and 104. The vibrating beams 102 and 104 periodically move between the active and transition states at a predefined frequency. The frequency may be dependent on one or more parameters of an intended application.

The vibrating beams 102 and 104 in one example lay substantially in the plane of the frame 118. To startup the gyroscope, the drive/sensor components 105 and 106 serve as drive components and start oscillation of the vibrating beam 102 in a first direction, such as in an out-of-plane direction. Once the vibrating beam 102 reaches operational oscillation in the out-of-plane direction (e.g., the vibrating beam 102 reaches a resonant frequency and full amplitude), the drive/sensor components 110 and 112 serving as sensor components sense and servo to zero the Coriolis force induced oscillation of the vibrating beam 102 to determine angular rate of the vibrating beam 102 during a first time period. The drive/sensor components 110 and 112 pickoff the Coriolis force induced oscillation in the in-plane direction and apply control voltages to servo the oscillation to zero. During the first time period, the drive/sensor components 107 and 108 serve as drive components and start oscillation of the vibrating beam 104 in one of the first or second directions, such as in the out-of-plane or in-plane direction. For example, the drive/sensor components 107 and 108 start oscillation of the vibrating beam 104 in the out-of-plane direction.

During time periods when the drive/sensor components 105 and 106 oscillate the vibrating beam 102 in the out-of-plane direction, the drive/sensor components 110 and 112 in one example sense and servo to zero the Coriolis force induced oscillation of the vibrating beam 102 in the in-plane direction. During time periods when the drive/sensor components 110 and 112 oscillate the vibrating beam 102 in the in-plane direction, the drive/sensor components 105 and 106 in one example sense and servo to zero the Coriolis force induced oscillation of the vibrating beam 102 in the out-of-plane direction.

Upon expiration of the first time period, the vibrating beam 104 moves from the transition state to the active state and the vibrating beam 102 moves from the active state to the transition state for the duration of a second time period. During the second time period, the vibrating beam 104 oscillates in the out-of-plane direction and the drive/sensor components 114 and 116 sense and servo to zero the Coriolis force induced oscillation of the vibrating beam 104 to determine angular rate of the vibrating beam 104. The drive/sensor components 114 and 116 pickoff the Coriolis force induced oscillation in the in-plane direction and apply control signals to servo the in-plane oscillation to zero. In the transition state, the drive/sensor components 110 and 112 serve as drive components and change oscillation of the vibrating beam 102 from the out-of-plane direction to a second direction, such as in the in-plane direction. The first oscillation direction of the vibrating beam 102 is substantially perpendicular to the second oscillation direction.

Upon expiration of the second time period, the vibrating beam 102 moves from the transition state to the active state and the vibrating beam 104 moves from the active state to the transition state for the duration of a third time period. During the third time period, the vibrating beam 102 oscillates in the in-plane direction and the drive/sensor components 105 and 106 sense and servo to zero the Coriolis force induced oscillation of the vibrating beam 102 to determine angular rate of the vibrating beam 102. The drive/sensor components 105 and 106 pickoff the Coriolis force induced oscillation in the out-of-plane direction and apply control signals to servo the oscillation to zero. In the transition state, the drive/sensor components 114 and 116 serve as drive components and change oscillation of the vibrating beam 104 from the out-of-plane direction to the in-plane direction.

Upon expiration of the third time period, the vibrating beam 104 moves from the transition state to the active state and the vibrating beam 102 moves from the active state to the transition state for the duration of a fourth time period. During the fourth time period, the vibrating beam 104 oscillates in the in-plane direction and the drive/sensor components 107 and 108 sense and servo to zero the Coriolis force induced oscillation of the vibrating beam 104 to determine angular rate of the vibrating beam 104. The drive/sensor components 107 and 108 pickoff the Coriolis force induced oscillation in the out-of-plane direction and apply control signals to servo the oscillation to zero. In the transition state, the drive/sensor component 105 and 106 serve as drive components and change oscillation of the vibrating beam 102 from the in-plane direction to the out-of-plane direction.

Upon expiration of the fourth time period, the vibrating beam 102 moves from the transition state to the active state and the vibrating beam 104 moves from the active state to the transition state for the duration of a fifth time period. Therefore, after the fourth time period, the vibrating beams 102 and 104 are back in the initial states of the first time period and can progress through the transition and active state sequence described above for the duration of operation.

Periodically reversing the drive and sense modes of the vibrating beams 102 and 104 reduces the bias uncertainty over time and temperature of the gyroscope. If the vibrating beam 102 is only driven in an out-of-plane or in-plane direction, bias errors will vary over time and temperature. Some error terms that contribute to a positive bias error for the in-plane direction contribute to a negative bias error for the out-of-plane direction. Therefore, the out-of-plane and in-plane bias errors average to a value approaching zero by periodically changing the drive and sense modes of the vibrating beams 102 and 104.

An illustrative description of another exemplary operation of the apparatus 100 is now presented, for explanatory purposes. In one example, the operation time of the gyroscope may be relatively long. So, during operation of the gyroscope, the drive/sensor components 105, 106, 107, 108, 110, 112, 114, and 116 periodically change modes of operation between drive and pickoff functions, as described above. In another example, the operation time of the gyroscope may be relatively short and undesirable to transition oscillation directions of the vibrating beams 102 and 104 for the entire duration of the operation time. Instead, upon startup of the gyroscope, the drive/sensor components 105, 106, 107, 108, 110, 112, 114, and 116 may periodically change the oscillation direction of the vibrating beams 102 and 104 during a calibration period. The calibration period estimates the bias errors for operation of the vibrating beams 102 and 104. Thus, the gyroscope can adjust for the estimated bias errors during operation and the vibrating beams 102 and 104 may remain in active oscillation during operation.

The apparatus 100 in one example comprises a plurality of components such as hardware components. A number of such components can be combined or divided in one example of the apparatus 100. The apparatus 100 in one example comprises any (e.g., horizontal, oblique, or vertical) orientation, with the description and figures herein illustrating one exemplary orientation of the apparatus 100, for explanatory purposes.

The steps or operations described herein are just exemplary. There may be many variations to these steps or operations without departing from the spirit of the invention. For instance, the steps may be performed in a differing order, or steps may be added, deleted, or modified.

Although exemplary implementations of the invention have been depicted and described in detail herein, it will be apparent to those skilled in the relevant art that various modifications, additions, substitutions, and the like can be made without departing from the spirit of the invention and these are therefore considered to be within the scope of the invention as defined in the following claims.

What is claimed is:

1. An apparatus, comprising:
   a vibrating beam;

a first drive component that for a first time period oscillates the vibrating beam in a first direction to sense angular rate of the vibrating beam; and a second drive component that for a second time period oscillates the vibrating beam in a second direction to sense angular rate of the vibrating beam.

2. The apparatus of claim 1, wherein the vibrating beam comprises a rectangular, triangular, hexagonal, octagonal, or circular prism substantially symmetric for oscillation in both the first and second directions.

3. The apparatus of claim 1, wherein the first direction is substantially perpendicular to the second direction.

4. The apparatus of claim 3, wherein a frame supports the vibrating beam in a plane, wherein the first direction comprises an in-plane direction, wherein the second direction comprises an out-of-plane direction.

5. The apparatus of claim 4, wherein the vibrating beam comprises a first vibrating beam, the apparatus further comprising a second vibrating beam, a third drive component, and a fourth drive component;

wherein the third drive component during the first period of time changes an oscillation direction of the second vibrating beam from a first one to a second one of the first and second directions;

wherein the third drive component between the first time period and the second time period oscillates the second vibrating beam in the second one of the first and second directions to sense angular rate of the second vibrating beam, wherein the second drive component between the first time period and the second time period changes an oscillation direction of the first vibrating beam from the first direction to the second direction;

wherein the fourth drive component during the second period of time changes the oscillation direction of the second vibrating beam from the second one to the first one of the first and second directions.

6. The apparatus of claim 1, wherein during the first and second time periods the vibrating beam is in an active angular rate sensing state, wherein between the first and second time periods the vibrating beam is in a transition state to achieve full amplitude oscillation in the second direction;

wherein the first and second drive components periodically switch the vibrating beam between the active angular rate sensing state and the transition state.

7. The apparatus of claim 6, wherein the vibrating beam comprises a first vibrating beam, the apparatus further comprising a second vibrating beam;

wherein upon expiration of the first time period, the second vibrating beam moves from the transition state to the active angular rate sensing state.

8. The apparatus of claim 7, further comprising a processing component, wherein one of the first and second vibrating beams is in the active angular rate sensing state at a given time;

wherein the processing component employs Coriolis induced oscillation information from the one of the first and second vibrating beams in the active angular rate sensing state to measure a direction and magnitude of the angular rate of the one of the first and second vibrating beams at the given time.

9. The apparatus of claim 1, wherein the first and second drive components periodically switch oscillation of the vibrating beam between the first direction and the second direction to promote a reduction of an angular rate measurement bias uncertainty over time and temperature of the vibrating beam.

10. The apparatus of claim 9, wherein a frame supports the vibrating beam in a plane, wherein the first direction comprises an in-plane direction and the second direction comprises an out-of-plane direction;

wherein the first and second drive components periodically switch oscillation of the vibrating beam between the in-plane direction and the out-of-plane direction to achieve angular rate measurement bias error terms of opposite polarity that cancel out over a plurality of oscillation periods in the first and second directions.

11. The apparatus of claim 1, wherein the first drive component comprises a first drive/sensor component, wherein the second drive component comprises a second drive/sensor component;

wherein the first drive/sensor component for the first time period drives oscillation of the vibrating beam in first direction, wherein the first drive/sensor component for the second time period senses Coriolis induced oscillation of the vibrating beam in the first direction;

wherein the second drive/sensor component for the first time period senses Coriolis induced oscillation of the vibrating beam in the second direction, wherein the second drive/sensor component for the second time period drives oscillation of the vibrating beam in the second direction.

12. The apparatus of claim 11, wherein the first and second drive/sensor components comprise electrostatic, magnetic, or piezoelectric drive/sensor components.

13. The apparatus of claim 1, wherein a plurality of vibrating beams comprises the vibrating beam, wherein the plurality of vibrating beams comprises two or more vibrating beams for each desired angular rate measurement axis.

14. The apparatus of claim 1, further comprising a processing component;

wherein the first and second time periods are time portions of a calibration period;

wherein the first and second drive components periodically transition between oscillation of the vibrating beam in the first and second directions during the calibration period to generate estimated bias errors for operation of the vibrating beam;

wherein after the calibration period, during an operation period, the processing component adjusts for the estimated bias errors during operation of the vibrating beam to measure a direction and magnitude of the angular rate of the vibrating beam.

15. The apparatus of claim 1, wherein the vibrating beam comprises a plurality of nodal points for oscillation in both the first and second directions, wherein the plurality of nodal points are internal to the vibrating beam;

wherein the vibrating beam comprises a plurality of apertures that expose a plurality of flexure components around the plurality of nodal points, wherein a frame couples with the plurality of flexure components to support the vibrating beam at the plurality of nodal points.

16. An apparatus, comprising:

a plurality of coplanar vibrating beams, wherein the plurality of coplanar vibrating beams comprises a first vibrating beam and a second vibrating beam;

a first set of drive/sensor components associated with the first vibrating beam; and a second set of drive/sensor components associated with the second vibrating beam;

wherein during a first time period the first set of drive/sensor components oscillates the first vibrating beam in an in-plane direction to sense angular rate of the first vibrating beam, wherein during the first time period the second set of drive/sensor components changes the second vibrating beam from oscillation in the in-plane direction to oscillation in an out-of-plane direction;

wherein during a second time period the second set of drive/sensor components oscillates the second vibrating beam in the out-of-plane direction to sense angular rate of the second vibrating beam, wherein during the second time period the first set of drive/sensor components changes the first vibrating beam from oscillation in the in-plane direction to oscillation in the out-of-plane direction.

17. The apparatus of claim 16, wherein during the first time period the first vibrating beam is in an active angular rate sensing state and the second vibrating beam is in a transition state, wherein during the first time period the first set of drive/sensor components senses a Coriolis induced oscillation of the first vibrating beam in the out-of-plane direction for measurement of an angular rate of the first vibrating beam;

wherein during the second time period the second vibrating beam is in an active angular rate sensing state and the first vibrating beam is in a transition state, wherein during the second time period the second set of drive/sensor components senses a Coriolis induced oscillation of the second vibrating beam in the in-plane direction for measurement of an angular rate of the second vibrating beam.

18. The apparatus of claim 16, wherein each of the first and second vibrating beams comprise a plurality of nodal points for oscillation in both the in-plane and out-of-plane directions;

wherein each of the first and second vibrating beams comprise a plurality of apertures around the plurality of nodal points that allow a frame to support the first and second vibrating beams at the plurality of nodal points of the first and second vibrating beams.

19. A method, comprising the steps of:

oscillating during a first time period a first vibrating beam of a gyroscope in a first direction to sense angular rate of the gyroscope;

changing during a second time period oscillation of the first vibrating beam from the first direction to a second direction contemporaneously with oscillation of a second vibrating beam of the gyroscope to sense angular rate of the gyroscope; and oscillating during a third time period the first vibrating beam in the second direction to sense angular rate of the gyroscope.

20. The method of claim 19, wherein the first and second vibrating beams comprise rectangular prisms, wherein the first direction is substantially perpendicular to the second direction;

wherein the step of oscillating during the first time period the first vibrating beam of the gyroscope in the first direction to sense angular rate of the gyroscope comprises the steps of:

driving oscillation of the first vibrating beam in the first direction; and sensing a Coriolis induced oscillation of the first vibrating beam in the second direction to determine the angular rate of the first vibrating beam;

wherein the step of changing during the second time period oscillation of the first vibrating beam from the first direction to the second direction contemporaneously with oscillation of the second vibrating beam of the gyroscope to sense angular rate of the gyroscope comprises the steps of:

driving oscillation of the second vibrating beam in the first direction; and sensing a Coriolis induced oscillation of the second vibrating beam in the second direction to determine the angular rate of the second vibrating beam;

wherein the step of oscillating during the third time period the first vibrating beam in the second direction to sense angular rate of the gyroscope comprises the steps of:

driving oscillation of the first vibrating beam in the second direction; and sensing a Coriolis induced oscillation of the first vibrating beam in the first direction to determine the angular rate of the first vibrating beam.

21. The method of claim 19, further comprising the step of:

averaging a plurality of angular rate measurements from both the first and second vibrating beams driven in both the first and second directions to reduce one or more angular rate measurement bias error terms.

* * * * *